(12) United States Patent
Riera et al.

(10) Patent No.: US 10,466,870 B2
(45) Date of Patent: Nov. 5, 2019

(54) USER INPUT PROCESSING FOR CONTROLLING REMOTE DEVICES

(71) Applicant: ORANGE, Paris (FR)

(72) Inventors: Julien Riera, Issy les Moulineaux (FR); Lukasz Roth, Bielsko-Biala (PL)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/740,212

(22) PCT Filed: Jun. 27, 2016

(86) PCT No.: PCT/IB2016/001070
§ 371 (c)(1),
(2) Date: Dec. 27, 2017

(87) PCT Pub. No.: WO2017/001931
PCT Pub. Date: Jan. 5, 2017

(65) Prior Publication Data
US 2018/0267675 A1    Sep. 20, 2018

(30) Foreign Application Priority Data
Jun. 30, 2015  (EP) .................................... 15306051

(51) Int. Cl.
*G06F 3/0482* (2013.01)
*G08C 17/00* (2006.01)
(Continued)

(52) U.S. Cl.
CPC .......... *G06F 3/0482* (2013.01); *G06F 3/0484* (2013.01); *G06F 3/04817* (2013.01);
(Continued)

(58) Field of Classification Search
CPC combination set(s) only.
See application file for complete search history.

(56) References Cited

U.S. PATENT DOCUMENTS

| 7,155,213 | B1 | 12/2006 | Almeda et al. |
| 10,204,618 | B2 * | 2/2019 | Dong ..................... G10L 15/08 |

(Continued)

OTHER PUBLICATIONS

International Search Report dated Oct. 14, 2016 for International Application No. PCT/IB2016/001071, filed Jun. 27, 2016.

(Continued)

*Primary Examiner* — Hien L Duong
(74) *Attorney, Agent, or Firm* — David D. Brush; Westman, Champlin & Koehler, P.A

(57) ABSTRACT

A method for managing a remote electronic device using a user interface on an electronic device. The electronic device is operatively connected to a database which associates, for each given device identifier, alternative argument values and graphical elements. The method includes: receiving a user input through the user interface on the electronic device; determining a first device identifier based on the user input; accessing the database to retrieve a first graphical element associated with a first alternative argument value of the first device identifier, the first alternative argument value matching the user input; and rendering the user input by outputting the retrieved first graphical element.

13 Claims, 5 Drawing Sheets

(51) Int. Cl.
  *G06F 3/0481* (2013.01)
  *G06F 3/0484* (2013.01)
(52) U.S. Cl.
  CPC ......... *G08C 17/00* (2013.01); *G08C 2201/20* (2013.01); *G08C 2201/30* (2013.01)

(56) References Cited

U.S. PATENT DOCUMENTS

| | | | |
|---|---|---|---|
| 10,241,753 B2* | 3/2019 | Alleaume | G06F 3/017 |
| 2008/0034081 A1 | 2/2008 | Marshall et al. | |
| 2008/0062141 A1* | 3/2008 | Chandhri | G06F 3/0482 |
| | | | 345/173 |
| 2011/0313775 A1 | 12/2011 | Laligand et al. | |
| 2012/0030712 A1 | 2/2012 | Chang | |
| 2014/0040748 A1* | 2/2014 | Lemay | G06F 3/167 |
| | | | 715/728 |
| 2014/0167931 A1* | 6/2014 | Lee | H04L 12/2818 |
| | | | 340/12.5 |
| 2015/0040012 A1* | 2/2015 | Faaborg | G06F 3/167 |
| | | | 715/728 |
| 2015/0261496 A1* | 9/2015 | Faaborg | G06F 3/167 |
| | | | 715/728 |
| 2015/0304171 A1* | 10/2015 | Kim | H04L 67/125 |
| | | | 715/733 |
| 2016/0154576 A1* | 6/2016 | Moore | F24F 11/30 |
| | | | 715/708 |
| 2016/0364161 A1* | 12/2016 | Han | G08C 17/00 |

OTHER PUBLICATIONS

Written Opinion of the International Searching Authority dated Oct. 14, 2016 for International Application No. PCT/IB2016/001071, filed Jun. 27, 2016.

International Search Report dated Sep. 28, 2016 for corresponding International Application No. PCT/IB2016/001070, filed Jun. 27, 2016.

* cited by examiner

USER INPUT PROCESSING FOR CONTROLLING REMOTE DEVICES

CROSS-REFERENCE TO RELATED APPLICATIONS

This Application is a Section 371 National Stage Application of International Application No. PCT/IB2016/001070, filed Jun. 27, 2016, the content of which is incorporated herein by reference in its entirety, and published as WO2017/001931 on Jan. 5, 2017, in English.

FIELD OF THE DISCLOSURE

The present invention generally relates to the control of remote electronic devices, such as connected objects for example.

It finds applications in electronic devices such as laptops, touchpads, mobile phones, Smartphones, wearable devices or smart watches.

In what follows, we consider, for illustrative purpose exclusively, electronic devices as mobile phones and remote electronic devices as connected objects.

Connected objects can be remotely controlled by mobile phones, for example by means of an application installed in the mobile phones providing a user interface.

It is meant by "connected object" any object able to perform a given function, according to optional parameters, and comprising a network interface to access an access point, thereby accessing a remote server (through a network such as the internet for example or a local Bluetooth network), or to receive commands from a mobile phone (or any electronic device).

For example, a connected coffee machine can perform basic functions such as "switch on" and "switch off". However, "switch on" can encompass several functions such as "prepare a latte coffee", "prepare an expresso", "prepare a cappuccino". In addition, each device and function can also be associated with parameters. For example, the parameters can be a volume of the coffee to be prepared. The parameters may therefore comprise "2 centiliters", "5 centiliters", etc.

Electronic devices such as mobile phones that are used to remotely control connected objects now provide several ways to receive a user input and to turn it into an instruction for a remote connected objet: touch display, keypad, microphone coupled with a speech-to-text application, etc.

The user therefore needs to indicate information that enables the mobile phone to generate an instruction for the remote connected object.

Such information can be communicated using complementary arguments of different types:
- a device identifier to identify the connected objet to be controlled or the group of connected objects to be controlled;
- a function identifier to identify the function to be performed by the identified connected object;
- optionally, a parameter identifier identifying a parameter of the identified function to be performed by the identified connected objet.

To indicate this information, argument values can be included in a user input such as a sentence "could you switch-on the bedroom light in blue". This sentence comprises three arguments, of different types: a device identifier having the value "bedroom light", a function identifier having the value "switch-on" and a parameter identifier having the value "blue".

However, as the size of these electronic devices is a growing concern, their screens tend to be smaller and smaller. In particular, areas intended to receive user inputs are particularly small. Moreover, some specific users (children, elders, etc.) can have trouble inputting data in these small and condensed input areas.

To solve these problems, methods have been proposed where graphical elements are used instead of words (characters) to render user inputs. Using these graphical elements provides an optimized interface as it makes the display of more information on a smaller screen possible. Moreover, children or elders have more facility to distinguish what is input on the screen, even on small screens.

To replace user input with graphical elements, words are usually extracted from a user input and compared with large databases making one-by-one correspondences between words and graphical elements. As many words are present in these databases, the user input must be accurate so that the correct word is extracted and the correct graphical element is retrieved from databases.

However, input errors are frequent, especially when it comes to small screens and children or elders. This is even more problematic in case of a user input comprising a speech-to-text conversion, which is not always reliable. These problems are particularly important when user inputs are used to remotely control connected objects, as users are generally in a situation where they cannot be focused on the electronic device remotely controlling the connected object. Moreover, finding a given word in a large database requires a large amount of processing resources. The document US 2011/0313775 discloses a computer-implemented method for information sharing between a portable computing device and a television system.

The document US 2012/0030712 discloses a method and system for network-integrated remote control that include voice activation of a user interface context on a remote control device.

SUMMARY

To address this need, a first aspect of the invention concerns a method for managing a remote electronic device using a user interface on an electronic device, the electronic device being operatively connected to a database associating, for each given device identifier, alternative argument values and graphical elements, the method comprising:
receiving a user input through the user interface on the electronic device;
determining a first device identifier based on the user input;
accessing the database to retrieve a first graphical element associated with a first alternative argument value of the first device identifier, the first alternative argument value matching the user input;
rendering the user input by outputting the retrieved first graphical element.

Therefore, the database from which graphical elements are retrieved stores associations between graphical elements and alternative argument values, for respective device identifiers, thereby reducing the processing resources that are required to retrieve a graphical element. Indeed, a preliminary "filtering" step can be performed by determining the first device identifier.

According to some embodiments of the invention, upon reception of the user input, the method may further comprise detecting an initial argument value in the user input, and the first alternative argument value may match the detected initial argument value.

Alternatively, contextual data of the user input can be used to determine the first alternative value. To this end, a current state of the remote electronic device identified by the first device identifier can be taken into account. For example, if the remote electronic device is a light, which functions include switch on and switch off only, and if the light is currently on, it can be deduced from a user input such as "light please", that the function value (argument value) to be selected as a first alternative argument value is "switch on".

However, the accuracy of the selection of the first alternative argument value is improved when the user input comprises the initial argument value.

In some embodiments, the method may further comprise receiving contextual data with the user input, the alternative argument values of the first device identifier can be filtered using the contextual data, and the first alternative argument value can be chosen among the filtered alternative argument values.

This improves the robustness of the remote control as it is ensured that the alternative argument value respects some contextual conditions.

According to some embodiments, the method may further comprise receiving contextual data with the user input, and the first device identifier can be determined using the contextual data.

This improves the accuracy and robustness of the determination of the first device identifier. The remote control is therefore more accurate because it is ensured that the alternative argument values correspond to the right device identifier (the one intended by the user).

Alternatively or in complement, the contextual data may comprise at least one among:
- location of the user;
- weather forecast data;
- temperature data;
- clock data;
- presence data;
- a user profile; or
- user rights to access and control remote electronic devices.

According to some embodiments, the method may further comprise retrieving the other graphical elements that are associated with the alternative argument values of the first device identifier, other than the first alternative argument value, the first graphical element can be a selectable element, the selection by the user of the selectable element outputting at least some of the retrieved graphical elements, and upon selection of a second graphical element, the first graphical element can be replaced by the second graphical element.

Modification of the user input is thereby simplified and accelerated, as the user does not have to input a new argument by typing characters or acquiring a voice input.

According to some embodiments, the method may further comprise sending an instruction to a remote electronic device identified by the first device identifier, the instruction comprising the argument value associated with the outputted graphical element.

In complement, the instruction can be sent to the remote electronic device upon validation by the user.

This avoids error manipulations by the user.

According to some embodiments of the invention, the alternative argument values of a given device identifier comprise alternative function values, each alternative function value identifying a function to be performed by a device identified by the first device identifier, and the first alternative argument value is a function value.

This ensures that the instructions sent to the remote electronic device can be executed and also limits the complexity associated with the search of the first alternative argument value.

In complement, the alternative argument values of a given device identifier further comprise alternative parameter values identifying parameters of functions performed by the device identified by the first device identifier, and a second graphical element is retrieved from the database, the second graphical element being associated with a second alternative argument value of the first device identifier, the second alternative argument value matching the user input and being an alternative parameter value. As a variant, instead of matching the user input, the second alternative argument value may be compatible with contextual data in a compatibility mesh.

This enables to enrich the user input as parameter of functions can be further specified.

In some embodiments, the method further comprises displaying the graphical element on the remote electronic device.

This enables to verify that the instruction sent corresponds to the user input.

A second aspect of the invention concerns a computer program product recorded on a storage medium and executable by a computer in the form of a software including at least one software module setup to implement the method according to the first aspect of the invention.

A third aspect of the invention concerns an electronic device for managing a remote electronic device using a user interface on an electronic device, the electronic device being operatively connected to a database associating, for each given device identifier, alternative argument values and graphical elements, the electronic device comprising:
a user interface arranged for receiving a user input;
a processor arranged for performing the following steps:
determining a first device identifier based on the user input;
accessing the database to retrieve a first graphical element associated with a first alternative argument value of the first device identifier, the first alternative argument value matching the user input;
rendering the user input by outputting the retrieved first graphical element.

A fourth aspect of the invention concerns a system comprising the electronic device according to the third aspect of the invention and a database associating, for each given device identifier, alternative argument values and graphical elements.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF ILLUSTRATIVE EMBODIMENTS

Figure 1:
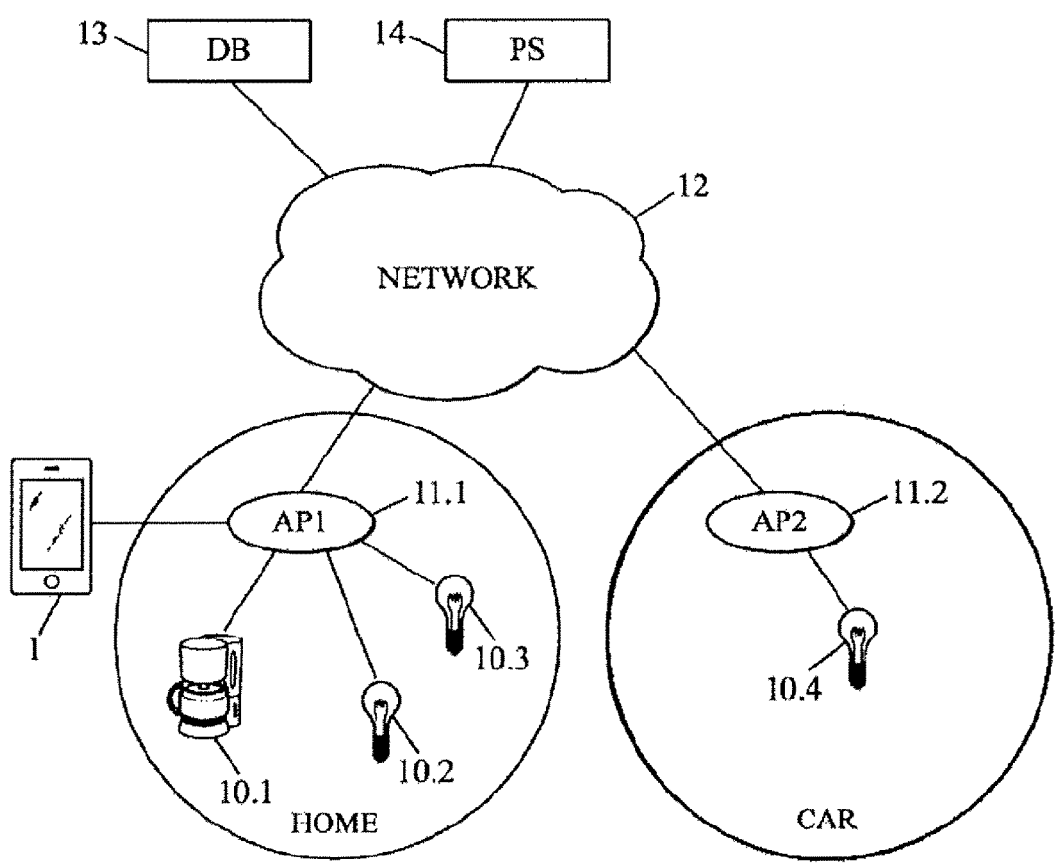
FIG. 1 represents a system according to some embodiments of the invention.

FIG. 1 illustrates a system according to some embodiments of the invention.

The system comprises an electronic device 1 such as a user terminal. As illustrated on FIG. 1, the electronic device 1 can be a mobile phone such as a Smartphone. The invention is not limited to this illustrative example, and also encompasses touch pads, laptops, desktop computers, etc.

The electronic device 1 can be used by the user to control remote electronic devices such as connected objects. In what follows, "remote electronic devices" are called "connected objects", for illustrative purposes.

The user of the electronic device 1 (also called "user terminal 1" hereafter) may have several connected objects located in different places:
- a connected coffee machine 10.1 located at home;
- a bedroom light 10.2 located at home;
- a kitchen light 10.3 located at home;
- a car light 10.4 located in a car.

Connected objects 10.1-10.3 are configured to access to a first access point 11.1 and connected objet 10.4 is configured to access to a second access point 11.2. No restriction is attached to the access technology used by the connected objects: wired or wireless means can be envisaged. In what follows, we consider the first and second access points as being Wi-fi access points.

Through the access points 11.1 and 11.2, the connected objects can access a network 12, such as the internet, and communicate with a remote service platform 14, for example to upload events or to receive instructions. Alternatively, the network 12 can be a local Bluetooth network and the remote service platform 14 is replaced by a local management entity. Several respective service platforms can also be envisaged for the different connected objects 10.1 to 10.4, and a unique service platform 14 has been represented for illustrative purposes exclusively.

The service platform 14 can also be accessed by the user terminal 1. For example, the user terminal can connect the access point 11.1 when the user is at home. Alternatively, the user may use a 3G/4G mobile network to access the service platform 14 with the user terminal 1.

An application dedicated to the service platform can be installed on the user terminal 1. Through this application, the user may enter user inputs that are converted to instructions. The instructions can then be used to control the connected objects 10.1-10.4. To this end, the instructions may be forwarded to the service platform 14, which then forwards (and optionally modifies or enriches) the instructions to the targeted connected objects 10.1-10.4.

The user terminal 1 is also operatively connected to a database 13. On FIG. 1, the database 13 can be accessed through the network 12. Alternatively, the database 13 can be stored in the user terminal 1 or can be integrated in the service platform 14.

The system illustrated on FIG. 1 is only provided for illustrative purposes. For example, the network used to control the connected objects 10.1-10.4 can be a local access network, such as a Bluetooth network for example, and, in that case, there is no need to access to a remote service platform.

As detailed hereafter, the database 13 stores, for each device identifier among a plurality of device identifiers, alternative argument values and graphical elements. Therefore, for each connected object 10.1-10.4, identified by a respective device identifier, alternative argument values correspond to graphical elements. Alternative argument values can comprise alternative function values and alternative parameter values. For a given device identified by a first device identifier, each alternative function value identifies a function to be performed (and that can be performed) by the given device, and an alternative parameter value identifies parameters of functions to be performed by the given device.

The database 13 may also store a compatibility mesh between the alternative argument values and contextual data. The alternative argument values can therefore be filtered by contextual data using the compatibility mesh.

It is meant by "compatibility mesh", any data structure that links elements that are compatible together. Based on a given element, it is possible to retrieve all the other elements that are linked to this given element in the compatibility mesh.

No restriction is attached to the format of the compatibility mesh. The compatibility mesh will be better understood in the description hereafter.

Such a compatibility mesh can be configured by the user, for example using the user terminal 1 or any device that is adapted to access the database 13.

Alternatively, the compatibility mesh can be configurable by another person than the user (for example a parent in case the user is a child, or any person being entitled to manage the compatibility mesh of the user). The compatibility mesh may also be configurable by a manufacturer of some of the connected objects, or by the service platform 14.

Figure 2:
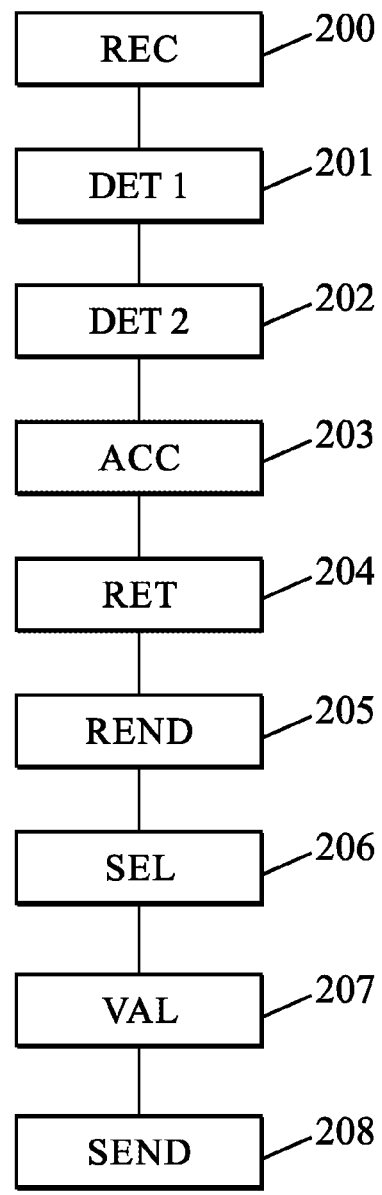
FIG. 2 is a flowchart illustrating the steps of a method according to some embodiments of the invention.

FIG. 2 is a diagram illustrating the steps of a method for managing a remote electronic device according to some embodiments of the invention.

At step 200, a user input is received through a user interface of the user terminal 1. No restriction is attached to the first user input, which can be a pronounced sentence acquired by a microphone and converted to text, or a character string input using a touch pad or a keyboard. At step 200, the user terminal 201 may also receive contextual data. No restriction is attached to what is meant by contextual data. The contextual data may comprise at least one element among
- location of the user acquired by a sensor, acquired for example through a GPS of the user terminal, or acquired using the location of the access point to which the user terminal 1 accesses the network 12;
- weather forecast data acquired via an application installed on the user terminal 1 for example; or
- temperature data acquired by a sensor of the user terminal 1, or acquired via the network 12; or
- clock data indicating the time at which the user input is received. Clock data can be retrieved from a clock application of the user terminal 1 for example; or
- other contextual data acquired by a sensor, retrieved from an external entity or input by the user in the user input.

Based on the user input, a first device identifier is determined at step 202. For example, the user input may comprise an argument value of the device identifier type, such as "coffee machine", "light", "bedroom light", "car light", etc. The connected object corresponding to the argument value is retrieved by the user terminal 1. In case the argument value does not correspond to any of the connected objects 10.1-10.4 of the user, an error message can be displayed on the user terminal 1 or a list of device identifiers that are compatible with contextual data might be displayed for selection by the user.

In addition, the contextual data may be used to determine the first device identifier. For example, if the argument value in the user input is "light", and that the user owns several lights ("car light", "bedroom light", kitchen light"), contextual data indicating that the user is in the car can be used to deduce the device identifier "car light".

At step 202, the method may also comprise detecting an initial argument value in the user input (other than an argument value of the device identifier type). For example, the initial argument value may be a parameter value or a function value, as it will be better understood when referring to FIGS. 3a to 3d.

At step 203, the user terminal 1 accesses the database 13, and retrieves, at step 204, a first graphical element associated with a first alternative argument value of the first device identifier, the first alternative argument value matching the user input.

For example, if the initial argument value has been detected at step 202, the first alternative argument value matches the initial argument value. If the initial argument value is the function value "switch on", then the first alternative argument value is also the function value "switch on". However, even when no initial argument value has been detected at step 202, the first alternative argument matching the user input can be determined. For example, if the bedroom light is currently off, it can be deduced from the user input "bedroom light please", that the user wants to switch on the bedroom light, and the first alternative argument value is therefore the function value "switch on".

In addition, if contextual data has been received by the user terminal 1, the alternative argument values of the first device identifier can be filtered using the contextual data and the compatibility mesh, and the first graphical element associated with the first alternative argument value is then retrieved from the filtered alternative argument values.

For example, the contextual data can be weather forecast data. When the weather forecast data indicates that the weather is sunny, the function values of the kitchen light can be filtered. For example, only the function "switch off" can be compatible with the contextual data "sunny" in the compatibility mesh, whereas "switch on" is not compatible with it. Therefore, only the graphical element associated with the function "switch off" can be retrieved in the database 13 for the device identifier "kitchen light".

At step 205, the user input is rendered by outputting the retrieved first graphical element on the user terminal 1.

Therefore, the method enables to perform the search for an argument value in a subpart of the database 13: indeed, only the argument values of the device identified by the first device identifier are taken into account as alternatives when determining the first alternative argument value. The required processing resources are therefore reduced compared to the solutions of the prior art. In addition, as the retrieved first graphical element is chosen among alternative argument values of a determined device identifier, erroneous user can be detected and avoided, because only the parameter and function values that can be performed by the identified device can be selected as the first alternative argument value.

According to an embodiment of the invention, at step 204, all the other graphical elements that are associated with the alternative argument values (optionally filtered by the contextual data and the compatibility mesh) other than the first alternative argument value, can also be retrieved from the database. In addition, as step 205, the outputted first graphical element can be a selectable element.

In that case, at an optional step 206, upon selection of the first graphical element, all the retrieved graphical elements are outputted, so that the user can select one of the outputted graphical elements. Upon selection of a second graphical element by the user, the first graphical element is replaced by the second graphical element on the display of the user terminal 1.

At step 207, the user may validate the user input rendered using the first graphical element (or the second graphical element replacing the first graphical element). This validation step by the user is optional. For example, the instruction can be automatically validated after expiration of a timer, or can be directly validated after replacement of the first graphical element by the second graphical element.

At step 208, optionally after validation by the user at step 207, an instruction is sent to the connected objet identified by the first device identifier, the instruction comprising the argument value associated with the outputted graphical element (first or second graphical element). For example, the instruction can be sent to the service platform 14 with the first device identifier, and the service platform 14 then forwards (and optionally modifies or enriches) the instruction to the identified connected objects.

FIGS. 3a to 3d illustrate a user interface on the user terminal 1, according to some embodiments of the invention.

Figure 3A:
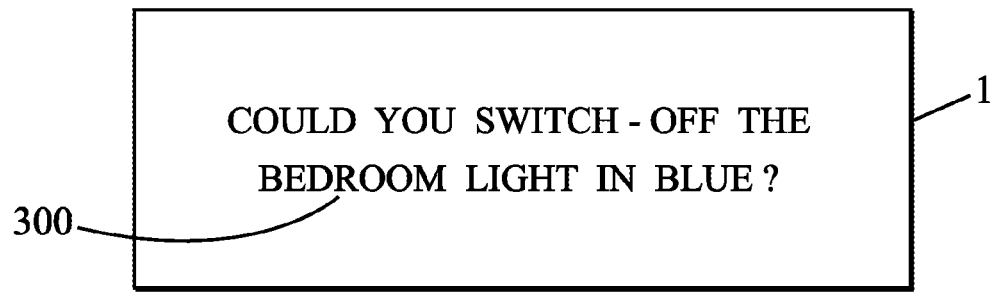
FIGS. 3a to 3d illustrate a graphical user interface of a user terminal according to some embodiments of the invention.

As illustrated on FIG. 3a, the first user input can be displayed on the touch screen as a graphical instruction 300, while the user is typing it (or while the user is speaking in a microphone). In the specific example shown on FIGS. 3a to 3d, the first input "Could you switch off the bedroom light in blue?" is received by the user terminal 1, at step 200.

Figure 3B:
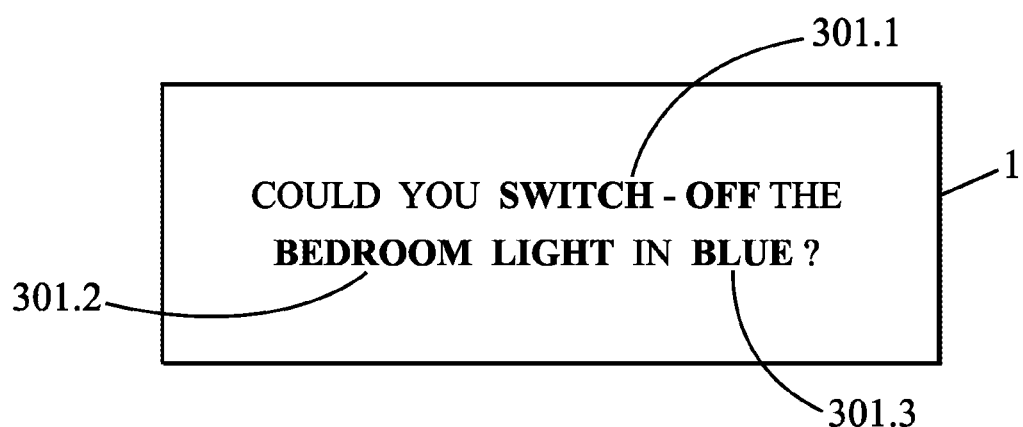

After the acquisition of the first user input, argument types can be detected at step 202 as shown on FIG. 3b. In this example, three argument types having respective initial argument values are detected in the first input:
- a function identifier 301.1 having the initial function value "switch-off";
- a device identifier 301.2 having the initial device value "bedroom light";
- a parameter identifier 301.3 having the initial parameter value "blue".

The device identifier 301.2 is used to determine the first device identifier at step 201. The first device identifier is therefore "bedroom light" identifying the connected object 10.2.

As explained, the present invention proposes to retrieve graphical elements for the argument values detected in the user input 300.

To this end, the database 13 can be accessed by the user terminal 1. When accessing the database 13, the user terminal indicates the determined first device identifier "bedroom light", so that only the alternative argument values of the bedroom light 10.2 are considered. The initial function value "switch off" is then used to determine the first alternative argument value among the plurality of alternative argument values. For example, the alternative argument values of the bedroom light identifier comprise:
- three alternative function values: switch off, switch on higher intensity, switch off lower intensity; and
- three alternative parameter values: blue, green, white.

Figure 3C:
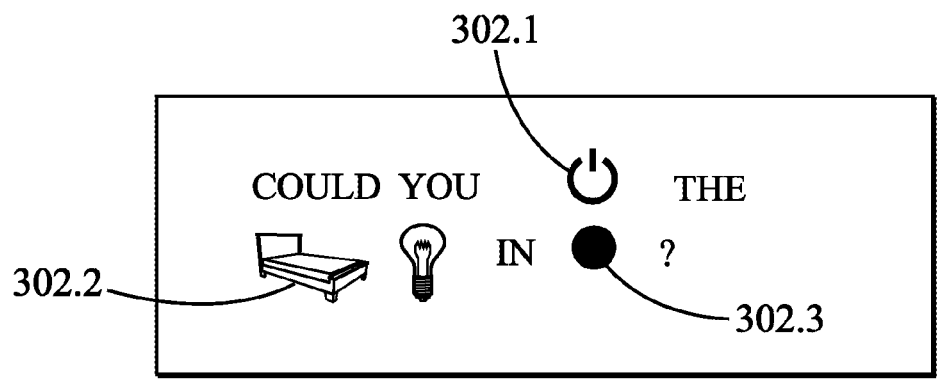

"Switch off" is therefore identified as the first alternative argument value, and the associated first graphical element is retrieved at step 204. The first graphical element is then outputted on the user terminal 1. Referring to FIG. 3c, the first graphical element is referenced 302.1.

A second graphical element can also be retrieved. Indeed, the initial parameter value "blue" is detected in the user input, and matches the second alternative argument value "blue" in the database 13. The second graphical element associated with the second alternative argument value "blue" is also retrieved at step 204, and outputted on the user terminal 1.

The second graphical element "blue" is referenced 302.3 on FIG. 3c.

As illustrated on FIG. 3c, a graphical element 302.2 can also be retrieved from the database 13 for the first device identifier "bedroom light".

As previously explained, the first graphical element 302.1 (and also the second graphical element) can be a selectable element.

Figure 3D:
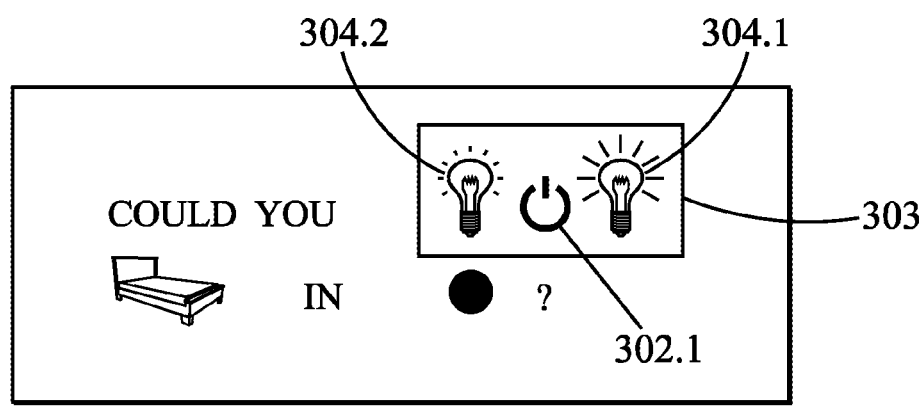

Upon selection by the user of the selectable element 302.1, and as illustrated on FIG. 3d, a window 303 is outputted on the user terminal 1, the window comprising the first graphical element and the graphical elements of the alternative parameter values other than the first alternative argument value.

A third graphical element 304.1 represents the function value "switch on higher intensity" and a fourth graphical element 304.2 represents the function value "switch on lower intensity". Selection by the user of an alternative argument value is therefore facilitated, especially for elders or children, and it avoids having to input a new argument value using a keyboard or a touch screen.

Figure 4:
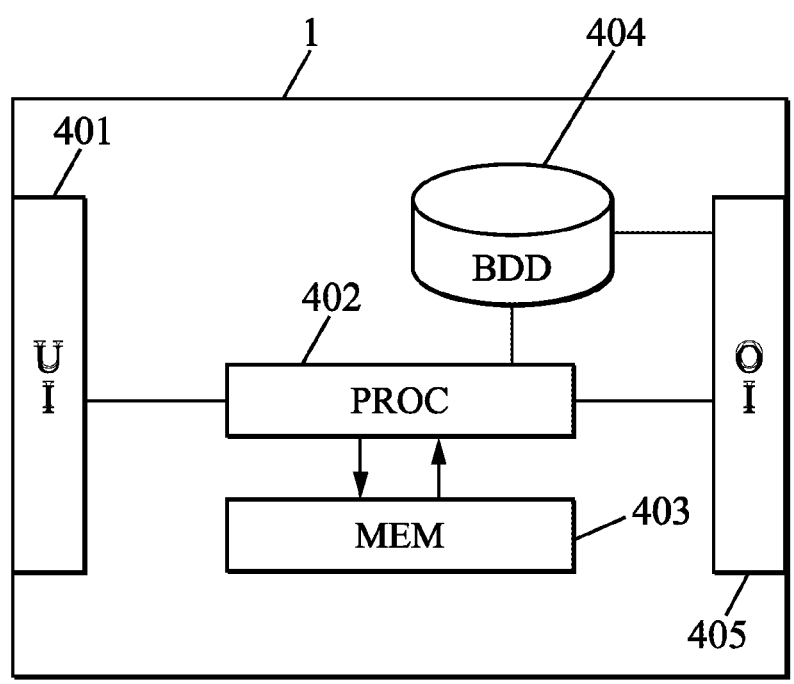
FIG. 4 illustrates a user terminal according to some embodiments of the invention.

FIG. 4 shows an electronic device 1 (or user terminal 1) according to some embodiments of the invention.

The user terminal 1 comprises a random access memory 403 and a processor 402 that can store instructions for performing the steps of a method as described above when referring to FIG. 2.

The user terminal 1 may also comprise a database 404 for storing data resulting from the method according to the invention. For example, the database 404 may store the data that are retrieved from the database 13 (associations between the alternative argument values and the graphical elements, compatibility mesh) and can store user identifiers. According to an embodiment, the database 13 can be stored in the user terminal, in database 404.

The user terminal 1 comprises a user interface 401 for receiving selections and user inputs by the user. The user interface 401 can for example comprise a touch display, a virtual or physical keyboard, press buttons, a camera and/or a microphone coupled to a speech-to-text application. The user terminal 1 also comprises a network interface 405 to communicate with the network 12 and in particular to transmit the user entries to the selected connected objects. The network interface can be a wired interface (Ethernet) or wireless (Bluetooth, 2G, 3G, 4G, Wi-fi, etc).

Although the present disclosure has been described with reference to one or more examples, workers skilled in the art will recognize that changes may be made in form and detail without departing from the scope of the disclosure and/or the appended claims.

The invention claimed is:

1. A method for managing a remote electronic device using a user interface on an electronic device, the electronic device being operatively connected to a database associating, for each given device identifier, alternative argument values and graphical elements, the method comprising acts performed by the electronic device, comprising:
   receiving a user input through the user interface on the electronic device;
   upon receiving the user input, detecting an initial argument value in the user input;
   determining a first device identifier based on the user input;
   after detecting the initial argument value and determining the first device identifier, accessing the database to retrieve a first graphical element associated with a first alternative argument value of the first device identifier, said first alternative argument value matching the detected initial argument value; and
   rendering the user input by outputting the retrieved first graphical element.

2. The method according to claim 1, wherein the method further comprises receiving contextual data with the user input;
   wherein the alternative argument values of the first device identifier are filtered using the contextual data, and wherein the first alternative argument value is chosen among the filtered alternative argument values.

3. The method according to claim 1, wherein the method further comprises receiving contextual data with the user input, and wherein the first device identifier is determined using the contextual data.

4. The method according to claim 2, wherein the contextual data comprises at least one among:
   location of the user;
   weather forecast data;
   temperature data;
   clock data;
   presence data;
   a user profile; or
   user's rights to access and control remote electronic devices.

5. The method according to claim 1, wherein the method further comprises retrieving the other graphical elements that are associated with the alternative argument values of the first device identifier, other than the first alternative argument value;
   wherein the first graphical element is a selectable element, the selection by the user of said selectable element outputting at least some of the retrieved graphical elements, and
   wherein upon selection of a second graphical element, the first graphical element is replaced by the second graphical element.

6. The method according to claim 1, further comprising sending an instruction to a remote electronic device identified by the first device identifier, said instruction comprising the argument value associated with the outputted graphical element.

7. The method according to claim 6, wherein the instruction is sent to the remote electronic device upon validation by the user.

8. The method according to claim 1, wherein the alternative argument values of a given device identifier comprise alternative function values, each alternative function value identifying a function to be performed by a device identified by the first device identifier, wherein the first alternative argument value is a function value.

9. The method according to claim 8, wherein the alternative argument values of a given device identifier further comprise alternative parameter value identifying parameters of functions performed by the device identified by the first device identifier,
   and wherein a second graphical element is retrieved from the database, said second graphical element being associated with a second alternative argument value of the first device identifier, said second alternative argument value matching the user input and being an alternative parameter value.

10. The method according to claim 1, further comprising displaying the graphical element on the remote electronic device.

11. A non-transitory computer readable storage medium comprising a computer program product recorded thereon comprising instructions, which when executed by a processor of an electronic device configure the electronic device to perform a method for managing a remote electronic device using a user interface on the electronic device, the electronic device being operatively connected to a database associating, for each given device identifier, alternative argument values and graphical elements, the method comprising:
 receiving a user input through the user interface on the electronic device;
 upon receiving the user input, detecting an initial argument value in the user input;
 determining a first device identifier based on the user input;
 after detecting the initial argument value and determining the first device identifier, accessing the database to retrieve a first graphical element associated with a first alternative argument value of the first device identifier, said first alternative argument value matching the detected initial argument value; and
 rendering the user input by outputting the retrieved first graphical element.

12. An electronic device for managing a remote electronic device using a user interface, the electronic device being operatively connected to a database associating, for each given device identifier, alternative argument values and graphical elements, the electronic device comprising:
 the user interface arranged for receiving a user input; and
 a processor arranged for performing the following operations:
 upon receiving the user input, detecting an initial argument value in the user input;
 determining a first device identifier based on the user input;
 after detecting the initial argument value and determining the first device identifier, accessing the database to retrieve a first graphical element associated with a first alternative argument value of the first device identifier, said first alternative argument value matching the detected initial argument value; and
 rendering the user input by outputting the retrieved first graphical element.

13. A system comprising the electronic device according to claim 12 and the database associating, for each given device identifier, alternative argument values and graphical elements.

* * * * *